US010583925B2

(12) United States Patent
McIntosh

(10) Patent No.: US 10,583,925 B2
(45) Date of Patent: Mar. 10, 2020

(54) AFT REST AREA ASSEMBLY WITHIN AN AIRCRAFT CABIN

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 904 days.

(21) Appl. No.: 14/620,536

(22) Filed: Feb. 12, 2015

(65) Prior Publication Data

US 2016/0236785 A1  Aug. 18, 2016

(51) Int. Cl.
*B64D 11/04* (2006.01)
*B64D 11/02* (2006.01)
*B64D 11/00* (2006.01)

(52) U.S. Cl.
CPC .............. *B64D 11/04* (2013.01); *B64D 11/00* (2013.01); *B64D 11/02* (2013.01)

(58) Field of Classification Search
CPC .......... B64D 11/00; B64D 11/02; B64D 11/04
See application file for complete search history.

(56) References Cited

U.S. PATENT DOCUMENTS

| 7,198,228 B2 * | 4/2007 | Mills ...................... B64D 11/00 244/118.5 |
| 2006/0054741 A1 | 3/2006 | Mills |
| 2009/0261200 A1 * | 10/2009 | Saint-Jalmes ...... B64D 11/0691 244/118.5 |
| 2009/0308973 A1 * | 12/2009 | Guering .................... B64C 1/06 244/58 |
| 2012/0273614 A1 * | 11/2012 | Ehlers .................... B64D 11/02 244/118.5 |
| 2013/0001359 A1 * | 1/2013 | Schliwa ................. B64D 11/02 244/118.6 |
| 2013/0206904 A1 * | 8/2013 | Gee ........................ B64D 11/02 244/118.5 |
| 2013/0206907 A1 * | 8/2013 | Burrows ................ B64D 11/02 244/118.5 |

(Continued)

FOREIGN PATENT DOCUMENTS

EP     2708467     3/2014

OTHER PUBLICATIONS

Extended European Search Report for EP 16154788.0-1754, dated Jul. 13, 2016.

*Primary Examiner* — Michael H Wang
(74) *Attorney, Agent, or Firm* — Joseph M. Butscher; The Small Patent Law Group, LLC

(57) ABSTRACT

An aft rest area assembly is positioned within an aft section of an internal cabin of an aircraft. The aft rest area assembly may include a lavatory section including at least one lavatory, a first galley station positioned on a first outboard side of the lavatory section, and a second galley station positioned on a second outboard side of the lavatory. The first outboard side is opposite from the second outboard side. The first galley station is separated from the second galley station by the lavatory section. The lavatory section may also include an egress flow director that forwardly extends into one or more egress paths of the internal cabin. The egress path(s) connect to at least one emergency exit door.

17 Claims, 10 Drawing Sheets

(56) References Cited

U.S. PATENT DOCUMENTS

| | | | | |
|---|---|---|---|---|
| 2014/0077033 A1* | 3/2014 | Scown | B64D 11/02 | |
| | | | 244/118.5 | |
| 2014/0083012 A1* | 3/2014 | Boren | B64D 11/02 | |
| | | | 49/176 | |
| 2014/0117156 A1* | 5/2014 | Boren | B64D 11/02 | |
| | | | 244/118.6 | |
| 2014/0123571 A1* | 5/2014 | Swain | B64D 11/0023 | |
| | | | 52/79.1 | |
| 2014/0196206 A1* | 7/2014 | Savian | B64D 11/02 | |
| | | | 4/664 | |
| 2014/0224930 A1* | 8/2014 | Ivester | B64D 11/04 | |
| | | | 244/118.5 | |
| 2014/0339360 A1* | 11/2014 | Moje | B64D 11/00 | |
| | | | 244/118.5 | |
| 2014/0339363 A1* | 11/2014 | Moje | B64D 11/00 | |
| | | | 244/118.5 | |
| 2014/0353425 A1* | 12/2014 | Boren, Jr. | B64D 11/04 | |
| | | | 244/118.5 | |
| 2014/0360099 A1 | 12/2014 | McIntosh | | |
| 2015/0096118 A1* | 4/2015 | McIntosh | B64D 11/02 | |
| | | | 4/664 | |
| 2015/0298809 A1* | 10/2015 | Minegishi | B64D 11/02 | |
| | | | 244/118.5 | |
| 2015/0298810 A1* | 10/2015 | Koyama | B64D 11/02 | |
| | | | 244/118.5 | |
| 2016/0039522 A1* | 2/2016 | Koyama | B64D 11/02 | |
| | | | 244/118.5 | |

\* cited by examiner

AFT REST AREA ASSEMBLY WITHIN AN AIRCRAFT CABIN

BACKGROUND OF THE DISCLOSURE

Embodiments of the present disclosure generally relate to aft rest area assemblies within a cabin of an aircraft.

Commercial aircraft typically include an interior cabin that may be divided into numerous sections. A cockpit is generally separated from a main passenger cabin (or main cabin), which may include a first class section, a business class section, and a coach section. The main passenger cabin may also include one or more work areas for flight personnel, such as galleys, which may include food, beverage, and waste storage structures. One or more aisles pass through the passenger cabin and connect each of the passenger sections to one or more paths to one or more doors of the aircraft.

Aircraft also typically include one or more lavatories within a cabin. Often, at least one lavatory is in the back or aft portion of an aircraft, which may generally be behind the main passenger cabin. Some aircraft include a lavatory that occupies a relatively large area within an aft section. Often, a galley is positioned proximate to the aft lavatory. However, with less emphasis on food preparation in the airline industry, galleys are often underutilized, and generally occupy more space than is necessary.

In certain known aircraft, the galley is configured for use by multiple flight attendants. However, multiple flight attendants using a single galley area may find that the space is cramped and restrictive. As such, the flight attendants may find that they bump into one another as they attempt to fulfill their work duties.

Further, in certain known aircraft, attendant seats are positioned proximate to one or more lavatories in the aft section. In general, flight attendants are unable to sit down on the attendant seats when a passenger is using an adjacent lavatory. In short, if a flight attendant is seated on an attendant seat, there is not enough clearance between the lavatory and the attendant seat to either open a lavatory door, or allow a passenger to enter or exit the lavatory. Accordingly, when positioned in a supporting position, the attendant seat and the attendant seated thereon may interfere with a door of the lavatory.

In general, various known aft sections within an aircraft are inefficiently configured for use. Lavatories and galleys within the aft sections may lead to inefficient and awkward movement and/or flow of passengers and attendants. Further, the configuration of various known aft sections within a cabin of an aircraft often result in passenger and/or attendant traffic congestion, which may lead to individuals loitering in or around the rear of the aircraft.

SUMMARY OF THE DISCLOSURE

Certain embodiments of the present disclosure provide an aft rest area assembly within an aft section of an internal cabin of an aircraft. The aft rest area assembly may include a lavatory section including at least one lavatory, a first galley station positioned on a first outboard side of the lavatory section, and a second galley station positioned on a second outboard side of the lavatory. The first outboard side is opposite from the second outboard side. The galley station is separated from the second galley station by the lavatory section, which may be centered with respect to the internal cabin.

The lavatory section may include an egress flow director that forwardly extends into an unused portion of an egress aisleway, which may be part of one or more egress paths of the internal cabin. The egress path(s) connects to at least one emergency exit door. In at least one embodiment, a front wall separates the aft rest area assembly from a seating area within the internal cabin. The egress flow director may include first and second forward walls that connect at a central apex. Each of the first and second forward walls may rearwardly recede in relation to the front wall from the central apex.

In at least one embodiment, the lavatory section includes first and second lavatories separated by a dividing wall, which may be centered with respect to the internal cabin. The dividing wall may include at least one moveable portion. The moveable portion(s) is moveable between a first position in which the first and second lavatories are separated by the dividing wall, and a second position in which the first and second lavatories are combined to form a single expanded lavatory.

Each of the first and second lavatories may include forward and rearward areas. Each of the forward areas may be wider than the rearward areas.

The dividing wall may be centered about a central longitudinal plane of the internal cabin. The dividing wall may be centered with respect to an aisle of the internal cabin. The dividing wall may divide the aft rest area assembly into first and second halves, in which the first half is a mirror image of the second half. The aft rest area assembly may be symmetrical with respect to the central longitudinal plane of the internal cabin.

The first galley station may include a first cart storage bin configured to removably retain a first mobile cart. The second galley station may include a second cart storage bin configured to removably retain a second mobile cart. The lavatory section may include at least one stowage area.

The aft rest area assembly may also include first and second attendant rest areas. The first attendant rest area may be proximate to the first galley station. The second attendant rest area may be proximate to the second galley station. Each attendant rest area may include a moveable curtain and at least one attendant seat. The attendant seat(s) may not interfere with any portion of the lavatory section, even when an individual is seated on the attendant seat(s).

In at least one embodiment, the lavatory section includes one or more lavatory receptacles configured to receive and retain one or more lavatory modules. As such, a wide variety of lavatory modules may be interchangeably secured within each lavatory receptacle.

Certain embodiments of the present disclosure provide an aft rest area assembly within an aft section of an internal cabin of an aircraft. The aft rest area assembly may include a lavatory section including at least one lavatory. The lavatory section may also include an egress flow director that forwardly extends into an unused portion of an egress aisleway, which may be part of one or more egress paths (such as an area between two swept egress paths) of the internal cabin. The egress path connects to at least one emergency exit door.

Certain embodiments of the present disclosure provide an aircraft that may include an internal cabin including a cockpit, a main cabin having a plurality of passenger seats and at least one attendant workstation, and an aft section behind the main cabin. The aft section includes an egress path(s) that connects to at least one emergency exit door. The aircraft may also include an aft rest area assembly within the aft section.

DETAILED DESCRIPTION OF THE DISCLOSURE

Figure 1:
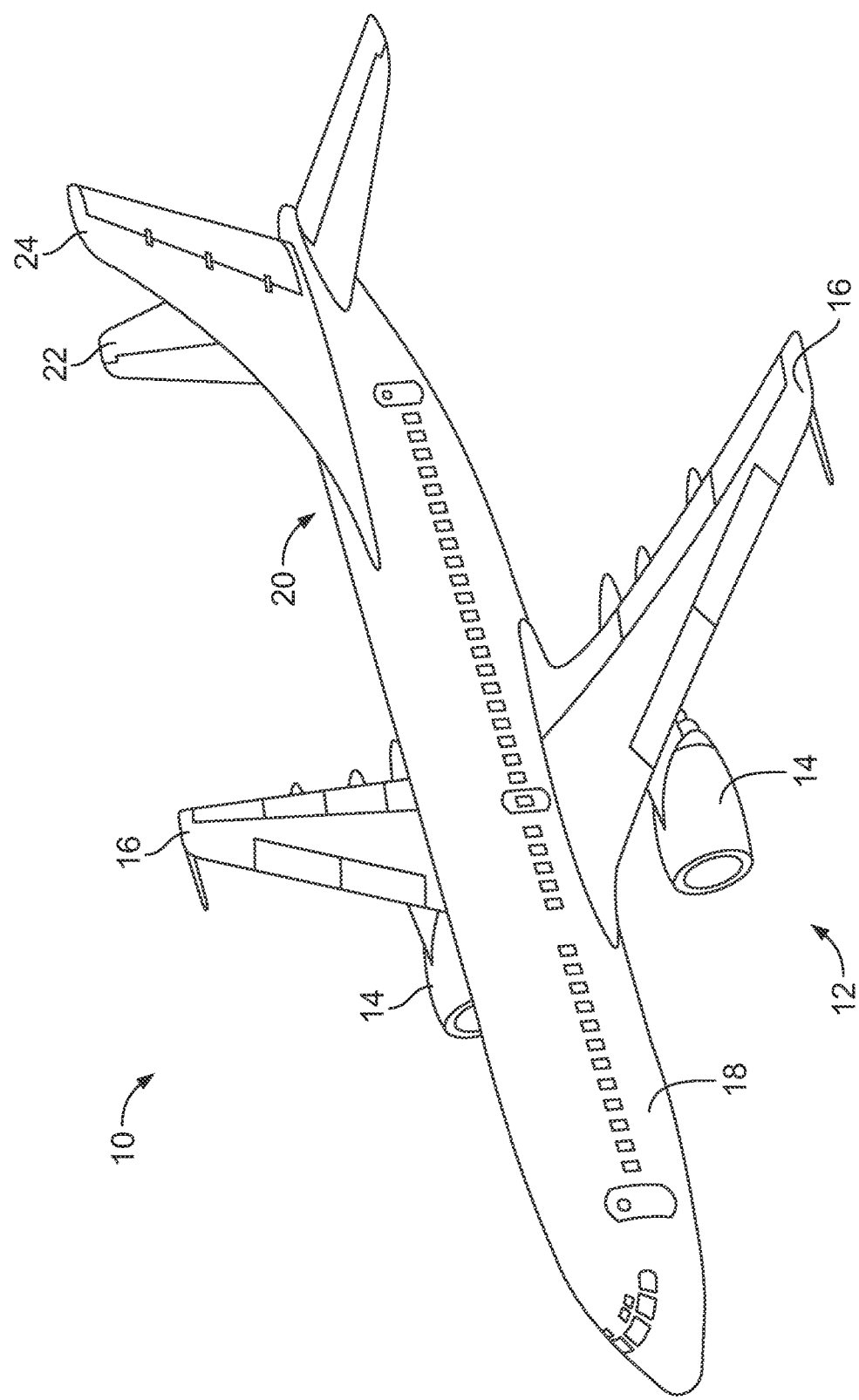
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide aft rest area assemblies positioned within internal cabins of aircraft. In at least one embodiment, an aft rest area assembly includes a lavatory section, having an egress flow director protruding forward therefrom, and separate and distinct galley stations. The egress flow director may include a forward end and an aft end. A footprint shape of the egress flow director may be triangular, peak-shaped, or forwardly curved, for example. The egress flow director may include at least one door to a lavatory. The egress flow director may be laterally aligned with an aircraft aisle.

Embodiments of the present disclosure provide aft rest area assemblies that create (for example, open up) cabin space for additional passenger revenue generating seats by enhancing cabin flexibility, such as by removing lavatories from a main cabin area of an aircraft. The aft rest area assemblies reduce a galley footprint, thereby reducing underutilization of galley space.

In at least one embodiment, an aft rest area assembly may be configured to accommodate persons with reduced mobility (such as disabled individuals, obese individuals, elderly individuals that require assistance from others, or those who use walkers, wheelchairs, and the like). For example, the aft rest area assembly may be configured to convert multiple lavatories into a single, expanded lavatory that is able to comfortably accommodate persons with reduced mobility.

In at least one embodiment, an aft rest area assembly may provide a straight, direct path down an aisle to one or more lavatories, thereby reducing passenger queues or lines, and generally reducing passenger traffic congestion. Further, the aft rest area assembly allows for attendant seats to be utilized at the same time that one or more lavatories are in use.

Embodiments of the present disclosure provide aft rest area assemblies that efficiently utilize valuable floor space within an aircraft. For example, an aft rest area assembly may include two lavatories that extend forward into a cabin (in comparison to a straight outer boundary wall that is perpendicular to a central longitudinal plane of the internal cabin). The egress flow director of the lavatories may extend into an unused portion of an egress path, such as an unused aisleway of one or more egress paths (such as an area between two swept egress paths) that connect to emergency exit doors, which, in turn, naturally directs passengers to the emergency exit doors in the event of an emergency. Notably, the egress flow director does not obstruct any portion of the egress path. Instead, the egress flow director forwardly extends to take advantage of a natural V-shaped area between two swept egress paths (similar to a fork in the road, for example) that extend toward each emergency exit.

In at least one embodiment, an aft rest area assembly includes two galley stations on either outboard sides of a central lavatory section. As such, instead of a single, cramped galley workstation, two separate and distinct galley stations may be used by two flight attendants (instead of the attendants working side-by-side in relation to a single cramped workstation). Further, the galley stations may include two separate and distinct attendant rest areas for two or more flight attendants. For example, each galley station may include its own attendant rest area. The attendant rest areas may be used even if an adjacent lavatory or lavatories are in use.

FIG. 1 illustrates a perspective top view of an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include a curtain assembly having a moveable curtain that may be selectively opened and closed within an aisle.

Figure 2A:
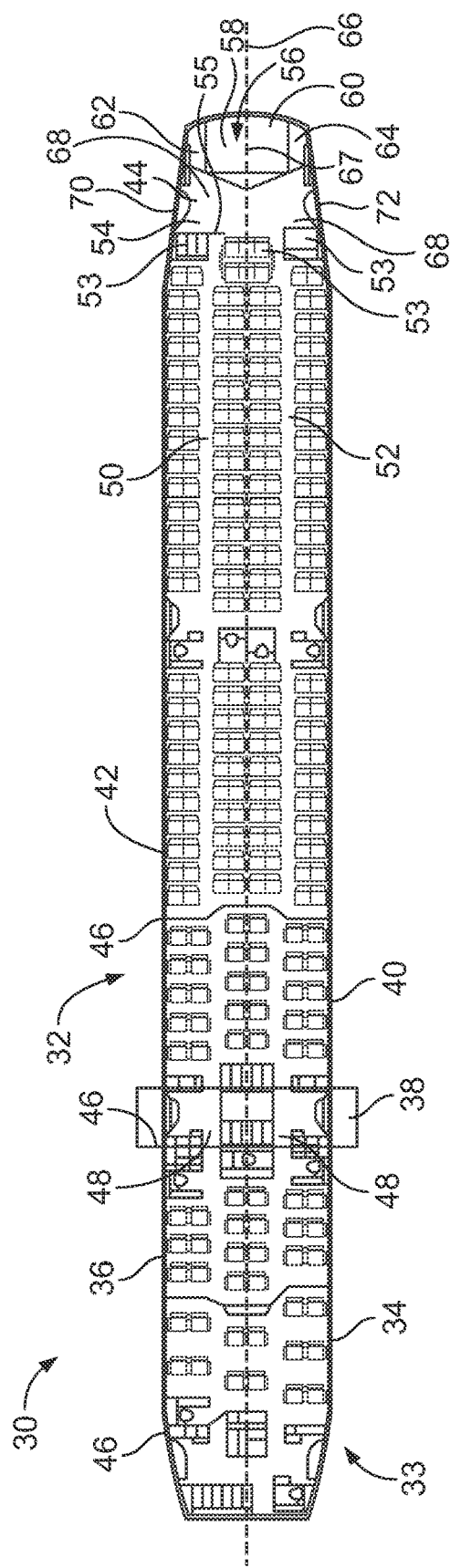
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include curtain assemblies between structural features (such as monuments, overhead bins, or the like) within aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

The aft section 44 is positioned behind or aft from a final row of seats 53 within the cabin 30. In general, the aft section 44 is behind the main cabin, which includes the passenger seating areas. A wall or partition 55 may separate a main portion of the cabin 30 from the aft section 44.

The aft section 44 may include an aft rest area assembly 56. The aft rest area assembly 56 may include a lavatory section having two adjacent lavatories 58 and 60. A first galley station 62 is outboard of the lavatory 58, while a second galley station 64 is outboard of the lavatory 60. The galley stations 62 and 64 are "outboard" in relation to the lavatory section in that they are positioned toward the fuselage wall(s) further away from the center of the main cabin as compared to the lavatory section (which may include the lavatories 58 and 60, as noted).

The aft rest area assembly 56 may be symmetrical with respect to a central longitudinal plane 66 of the cabin 30. The central longitudinal plane 66 may bisect the cabin 30 into two halves of equal area and volume. A dividing wall 67 between the adjacent lavatories 58 and 60 may be coplanar (or have a central portion that is coplanar) with the central longitudinal plane 66. As such, the aft rest area assembly 56 may be divided into two equal halves that may be mirror images of one another.

The aft rest area assembly 56 may also include one or more egress paths 68 that connect to emergency exit doors 70 and 72 on opposite sides of the fuselage 32. The egress path(s) 68 may be perpendicular to the aisles 50 and 52.

Figure 2B:
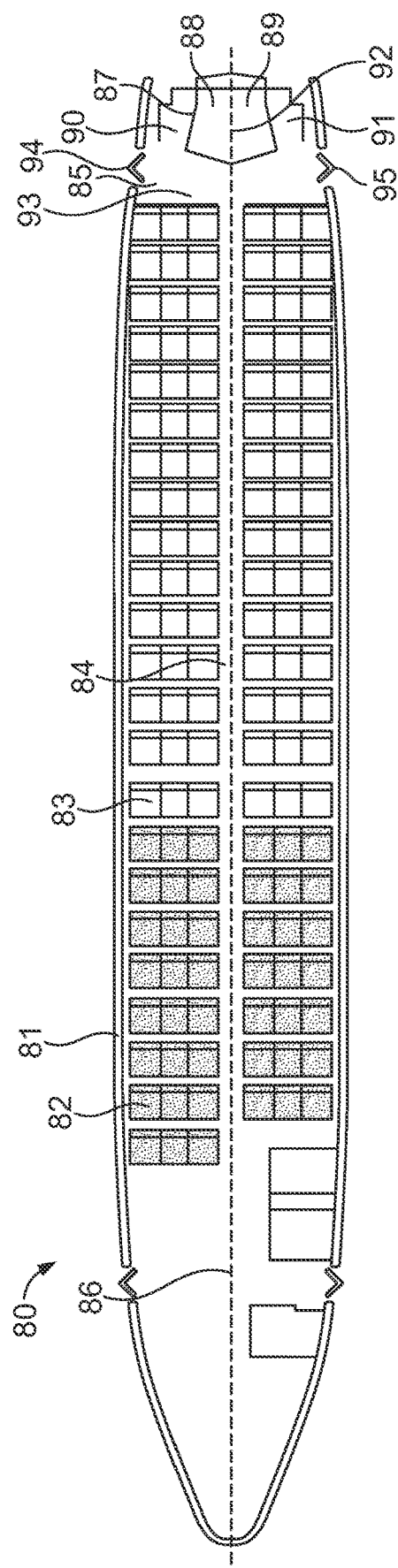
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane 86 of the internal cabin 80.

The aft section 85 may include an aft rest area assembly 87. The aft rest area assembly 87 may include a lavatory section having two adjacent lavatories 88 and 89. A first galley station 90 is outboard of the lavatory 88, while a second galley station 91 is outboard of the lavatory 89.

The aft rest area assembly 87 may be symmetrical with respect to the central longitudinal plane 86 of the cabin 80. The central longitudinal plane 86 may bisect the cabin 80 into two halves of equal area and volume. A dividing wall 92 between the adjacent lavatories 88 and 89 may be coplanar (or have a central portion that is coplanar) with the central longitudinal plane 86. As such, the aft rest area assembly 87 may be divided into two equal halves that may be mirror images of one another.

The aft rest area assembly 87 may also include one or more egress paths 93 that connect to emergency exit doors 94 and 95 on opposite sides of the fuselage 81. The egress path(s) 93 may be perpendicular to the aisle 84.

Figure 3:
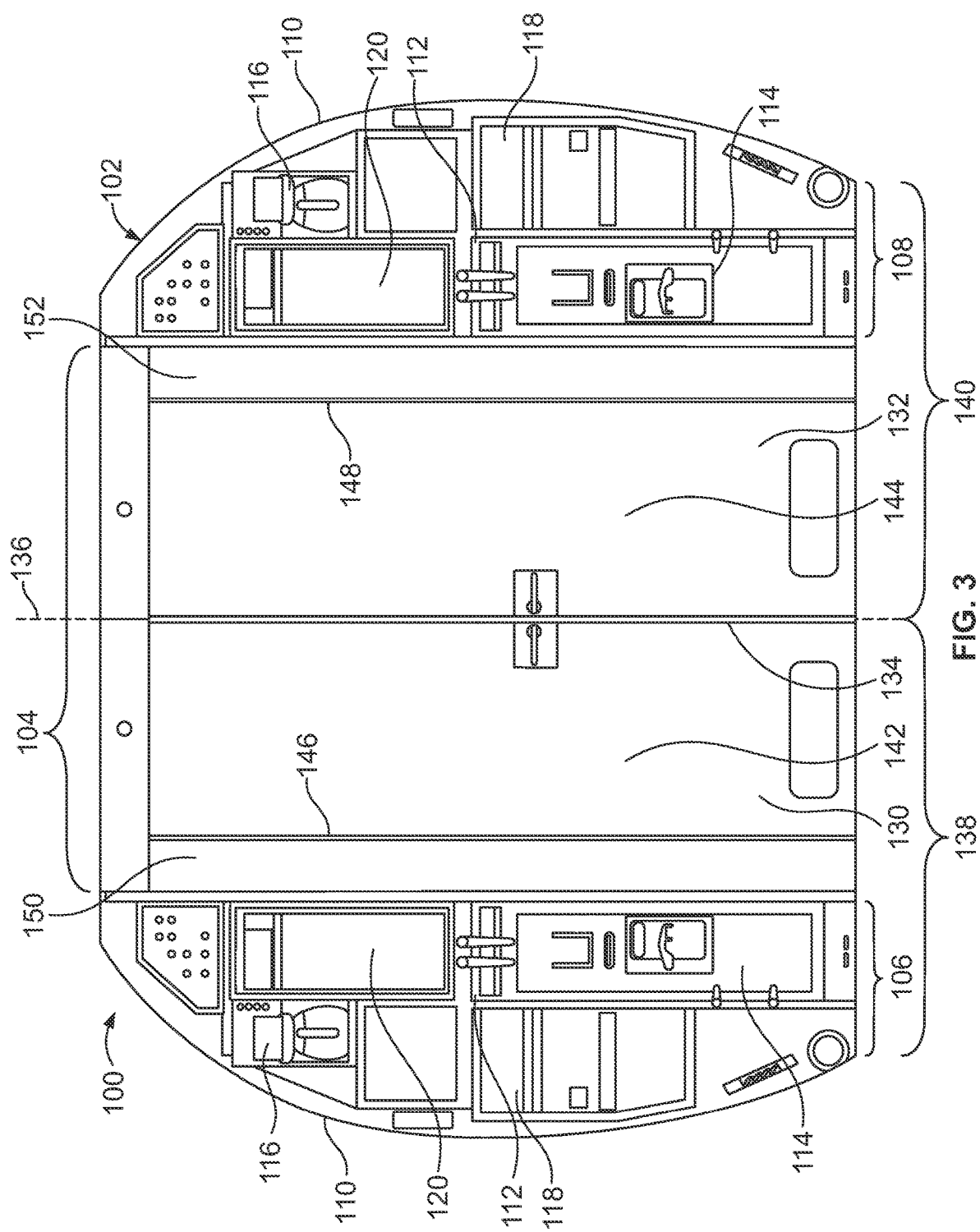
FIG. 3 illustrates a front view of an aft rest area assembly within an internal cabin of an aircraft, according to an embodiment of the present disclosure.

FIG. 3 illustrates a front view of an aft rest area assembly 100 within an internal cabin 102 of an aircraft, according to an embodiment of the present disclosure. The aft rest area assembly 100 is positioned within an aft section of the aircraft, such as within the aft section shown in FIGS. 2A and 2B.

The aft rest area assembly 100 includes a lavatory section 104, a galley station 106 on one side of the lavatory section 104, and a galley station 108 on an opposite side of the lavatory section 104. As shown, the galley station 106 is outboard from the lavatory section 104 towards one side of the internal cabin 102, while the galley station 108 is outboard from the lavatory section 104 towards an opposite side of the internal cabin 102. The galley stations 106 and 108 are outboard of the lavatory section 104 in that they are closer to and/or directly connect to a fuselage wall 110 that defines the internal cabin 102. As such, the aft rest area assembly 100 includes two, separate and distinct galley stations 106 and 108 that are not directly connected to one another. For example, the galley stations 106 and 108 do not abut into one another, but are, instead, separated by the lavatory section 104.

Each galley station 106 and 108 may include a cart storage bin 112 that is configured to retain a mobile cart 114. The mobile cart 114 is configured to carry various refreshments, such as soft drinks, alcoholic beverages, meals, snacks, discarded rubbish, and the like. Each mobile cart 114 may be moved into and out of the respective cart storage bins 112. The galley stations 106 and 108 may also include various other components, such as a hot beverage station 116, a trash bin 118, a warming station 120 (such as an oven), and the like. The galley stations 106 and 108 may include more or less components and sections than shown, and may be arranged in different configurations than shown.

The lavatory section 104 may include first and second lavatories 130 and 132 separated by a dividing wall 134. The dividing wall 134 may be (or otherwise have a central portion that is) coplanar with a central longitudinal plane 136 of the cabin 102. As shown in FIG. 3, the aft rest area assembly 100 may be symmetrical with respect to the central longitudinal plane 136. As such, the aft rest area assembly 100 may include first and second halves 138 and 140 that are mirror images of one another. It is to be understood that "mirror images" refers to the space that each lavatory 130 and 132 and each galley station 106 and 108 occupies within the cabin 102. For example, if a coffee pot is removed from one galley station 106 or 108, but not another, the first and second halves 138 and 140 are still mirror images of one another.

Each lavatory 130 and 132 includes a door 142 and 144, respectively. The doors 142 and 144 include outboard hinges 146 and 148, respectively, connected to walls 150 and 152, respectively, which allow the doors 142 and 144 to be pivoted open away from the dividing wall 134. In this manner, the doors 142 and 144 may not swing into one another.

Figure 4:
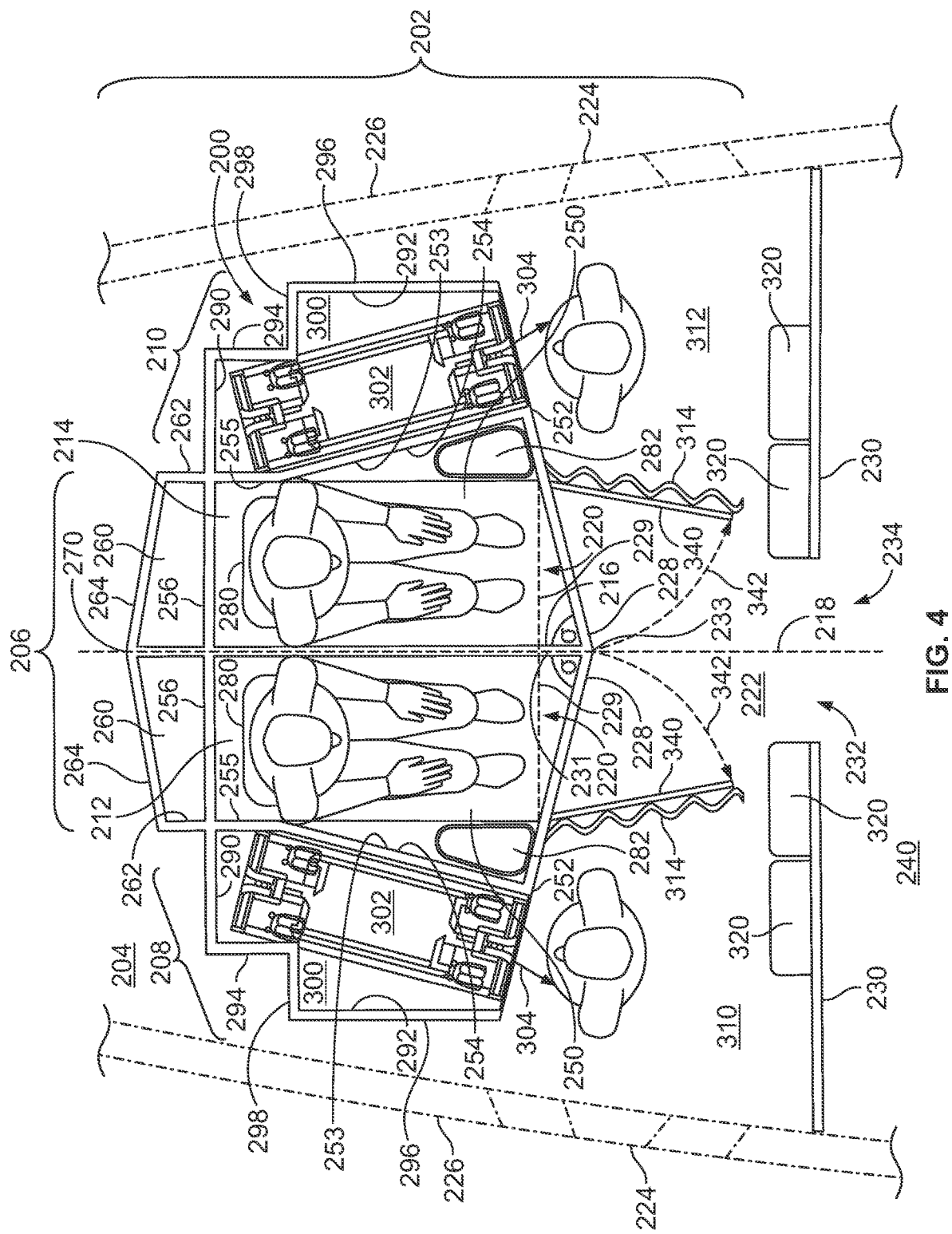
FIG. 4 illustrates a top internal view of an aft rest area assembly within an aft section of an internal cabin of an aircraft, according to an embodiment of the present disclosure.

FIG. 4 illustrates a top internal view of an aft rest area assembly 200 within an aft section 202 of an internal cabin 204 of an aircraft, according to an embodiment of the present disclosure. The aft rest area assembly 200 includes a lavatory section 206 and outboard galley stations 208 and 210, as described above. The lavatory section 206 includes adjacent lavatories 212 and 214 separated by a dividing wall 216. The dividing wall 216 may have a central portion that is coplanar with a central longitudinal plane 218 of the cabin 204.

As shown, each lavatory 212 and 214 includes an egress flow director 220 that extends into an unused portion of one or more egress paths 222 (such as an area between two swept egress paths), which leads to emergency exit doors 224 on either side of a fuselage 226. For example, the egress flow director 220 may extend into an unused aisleway portion of the egress path(s) 222. As shown, each egress flow director 220 may be shaped as a smooth-edged right-angled triangle having a hypotenuse as defined by at least a portion of a forward wall 228, a base 229 that is perpendicular to the dividing wall 216, and a side 231, which is a segment of the dividing wall 216 that intersects with the base 229. In general, the base 229 is a linear portion that indicates the outer front wall boundary of previous, known aft section monuments. The egress flow director 220 may include aesthetically-pleasing curves rather than sharp angles (which may not otherwise match the rest of the interior of the cabin). The egress flow director 220 promotes faster, more intuitive movement towards the emergency exit doors.

The egress flow director 220 does not obstruct any portion of the egress path(s) 222. Instead, the egress flow director 220 forwardly extends to take advantage of a natural V-shaped area between two swept portions of the egress path(s) 222 (similar to a fork in the road, for example) that extend toward each emergency exit. It is to be understood that by indicating that the egress flow director 220 extends into an unused portion of the egress path(s) 222, the egress flow director 220 does not in any way obstruct, extend into, or otherwise obstruct any portion of a legally-mandated size, shape, or other such aspect of the egress path(s) 222.

As shown, the forward wall 228 is angled with respect to a separating front wall 230 of the aft rest area assembly 200 that separates the aft rest area assembly 200 from seating areas within the cabin 204. It is to be understood that the front wall 230 may be a fixed, solid wall, a flexible partition, or the like. As shown, the forward walls 228 rearwardly recede in relation to the front wall 230 from the dividing wall 216. That is, starting from a central apex of the dividing wall 216 (that is, the central and forward most edge of the dividing wall 216), the forward walls 228 rearwardly recede as they extend closer to the fuselage walls 228. The front wall 230 is perpendicular to the central longitudinal plane 218. An opening 232 is formed through a center of the front wall 230 and leads to an aisle 234 of the internal cabin 204. More or less openings may be formed through the front wall 230, depending on the number of aisles within the internal cabin 204. It is to be understood that the portions of the egress flow director 220, such as the central apex of the dividing wall 216, may be curved, smooth, and seamlessly blend in with the interior of the cabin 204. That is, even though described as an apex, the egress flow director 220 may not include sharp edges, for example.

The center of the aisle 234 may be centered about the central longitudinal plane 218. Further, the center of the aisle 234 may be aligned with the dividing wall 216, which is also centered about the central longitudinal plane 218. In this manner, the lavatory section 206 is aligned with the aisle 234. It has been found that the coaxial alignment of the aisle 234 with the lavatory section 206 improves passenger access and flow to the lavatories 212 and 214, and reduces passenger traffic congestion in the aisle 234.

Each forward wall 228 angles rearwardly away from the dividing wall 216. Accordingly, each forward wall 228 forms an angle $\theta$ with the dividing wall 216. The angle $\theta$ is less than 90°. As shown, the angle $\theta$ may be between 45°-60°, although the angle $\theta$ may be greater (but less than 90°) or lesser. As such, a forward edge 233 of the dividing wall 216 forms a peak or apex that is the furthest point to which the lavatory section 206 extends towards a main cabin 240 of the internal cabin 204. In this manner, in an emergency situation, the rearward angled surface of the forward walls 228 automatically directs passengers towards the emergency exit doors 224. At the same time, the rearwardly-angled forward walls 228 provide internal lavatory space 250 that is greater than if the forward walls 228 were parallel to the front wall 230. Accordingly, the rearwardly-angled forward walls 228 utilize more space for lavatories (in contrast to if the areas of the egress flow directors were merely dead space within unused portions of the egress paths 222, such as the dead space between two egress paths).

Alternatively, egress flow directors 220 may not include a triangular shape. Instead, the egress flow directors may be forwardly bowed or curved shaped, for example. Also, alternatively, the aft rest area assembly 200 may not include the egress flow directors. Instead, the forward walls of the lavatories may be parallel with the front wall 230.

Each forward wall 228 may include an end 252 that is distally located from the dividing wall 216. The end 252 connects to an angled segment 253 of a lateral boundary wall 254 at a right angle, thereby expanding the internal lavatory space 250. The lateral boundary wall 254 is angled (that is, non-parallel) with respect to the dividing wall 216. The lateral boundary wall 254 also includes a rear segment 255 that connects to an opposite end of the angled segment 253. The rear segment 255 may be parallel to the dividing wall 216.

The rear segment 255 connects to the dividing wall 216 through a rear wall 256, which may be perpendicular to the dividing wall 216 and the rear segment 255. As shown, each internal lavatory space 250 is defined by a forward wall 228, a lateral boundary wall 254, the rear wall 256, and the dividing wall 216. The forward area of each lavatory space 250 is wider and expanded in relation to the rearward area, due to the angled forward wall 228, for example. The expanded area within the lavatory spaces 250 provides an increased area through which an individual may move, thereby providing a more comfortable space.

Stowage areas 260 may be located behind each rear wall 256. Each stowage area 260 may be defined by rear surfaces of a rear wall 256, the dividing wall 216, a lateral wall 262, and an angled rear wall 264 that forwardly angles from a peak 270 defined by the dividing wall 216 toward the respective lateral wall 262. The rear wall 264 may be angled in order to accommodate a domed pressure bulkhead, for example. The stowage areas 260 take advantage of the domed pressure bulkhead by being adjacent to one another and separated by the dividing wall 216. In this manner, the stowage areas 260 have inboard portions that are proximate to the tallest or deepest internal areas of the domed pressure bulkhead, which is generally at the central longitudinal plane 218 of the cabin 204. Each stowage area 260 may have a front face that may be covered by a mirror, for example. Each stowage area 260 may include access doors, which may be locked and accessible by flight crew, for example. Alternatively, the at rest area assembly 200 may not include the stowage areas 260.

As shown, each lavatory 212 and 214 may include a toilet 280 and a sink 282. The toilets 280 may be proximate to the rear walls 256. The sinks 282 may be located proximate to the junction of the forward walls 228 and the lateral boundary walls 254. Alternatively, the toilets 280 and the sinks 282 may be located at various other areas within the lavatory spaces 250.

Each galley station 208 and 210 may be defined by an outer surface of a lateral boundary wall 254, a rear wall 290 that is coplanar with the rear walls 256, and an outboard wall 292 having a rear segment 294 that connects to a front segment 296 through a transition segment 298. The rear segment 294 and the front segment 296 may be parallel with the dividing wall 216. The transition segment 298 may be perpendicular to the dividing wall 216 and connects to the rear and front segments 294 and 296 at right angles.

Each galley station 208 and 210 may include a cart storage bin 300 defined by the lateral boundary wall 254, the rear wall 290 and the outboard wall 292. The cart storage bin 300 is configured to securely retain a cart 302 therein. As shown, the carts 302 may be stored at an angle with respect to the dividing wall 216. For example, the carts 302 may be stored at an angle that is parallel to the angled segment 253 of the lateral boundary wall 254. Each cart 302 may be initially removed in a direction 304 that is parallel to the angled segment 253, and then swung around in a final removal direction that is parallel to the dividing wall 216, so as not to abut into inwardly-extending portions of the emergency exit doors 224, for example. Alternatively, the carts 302 may be fully removed in the direction of arrow 304. Also, alternatively, the carts 302 may be stored in an orientation that is parallel to the dividing wall 216. For example, each cart 302 may be stored so that an outboard wall is flush against an internal surface of the outboard wall 292.

The aft rest area assembly 200 also includes attendant rest areas 310 and 312 between each galley station 208, 210, respectively, and the front wall 230. A curtain 314 (moveably connected to a curtain track or bracket secured to walls and/or the ceiling within the internal cabin 204) may be positioned between the attendant rest areas 310, 312 and an area that connects the lavatory section 206 to the aisle 234. Each attendant rest area 310 and 312 may include one or more attendant seats 320 connected to the front wall 230.

As shown, the forward wall 228 of each lavatory 212, 214 includes a door 340. The doors 340 are configured to pivot open away from the dividing wall 216 in the direction of arcs 342. An outer open limit of each door 340 may not extend into the curtain 314. Accordingly, the doors 340 may not be able to extend into the attendant rest areas 310 and 312. Further, as shown, the doors 340 do not contact the attendant seats 320 at their points of greatest open extension. Accordingly, an attendant may be seated on one of the attendant seats 320 and not interfere with passengers entering or exiting the lavatories 212 and 214. Indeed, attendants may close the curtains and rest within the attendant rest areas 310 and 312 without seeing, or being seen, by passengers. While the attendant rest areas 310 and 312 are shown having two attendant seats 320, each attendant rest area 310 and 312 may include more or less attendant seats 320 than shown.

The aft rest area assembly 200 may be symmetrical about the central longitudinal plane 218 of the cabin. Each lavatory 212 and 214 may be a mirror image of the other. Further, each galley station 208 and 210 may be a mirror image of the other. Also, each attendant rest area 310 and 312 may be a mirror image of the other. As noted above, the aft rest area assembly 200 may be symmetrical about the central longitudinal plane 218 with respect to the areas designated for the lavatories 212, 214, the galley stations 208, 210, and/or the attendant rest areas 310, 312. The dividing wall 216 may bisect the aft rest area assembly 200 into two equal halves that are mirror images of one another. The mirror images are with respect to the actual areas or footprints defined by the walls of the aft rest area assembly 200. For example, the lavatories 212 and 214 may include different components, such that one lavatory 212 includes a urinal, and the other lavatory 214 does not include a urinal. However, the presence of different components within such lavatories does not necessarily mean that the lavatories are asymmetrical. Instead, the internal areas or footprints defined by the walls of the lavatories 212 and 214 are still symmetrical.

Alternatively, certain portions of the aft rest area assembly 200 may not be symmetrical. For example, one of the lavatories may have a different sized and shaped internal space than the other.

Figure 5:
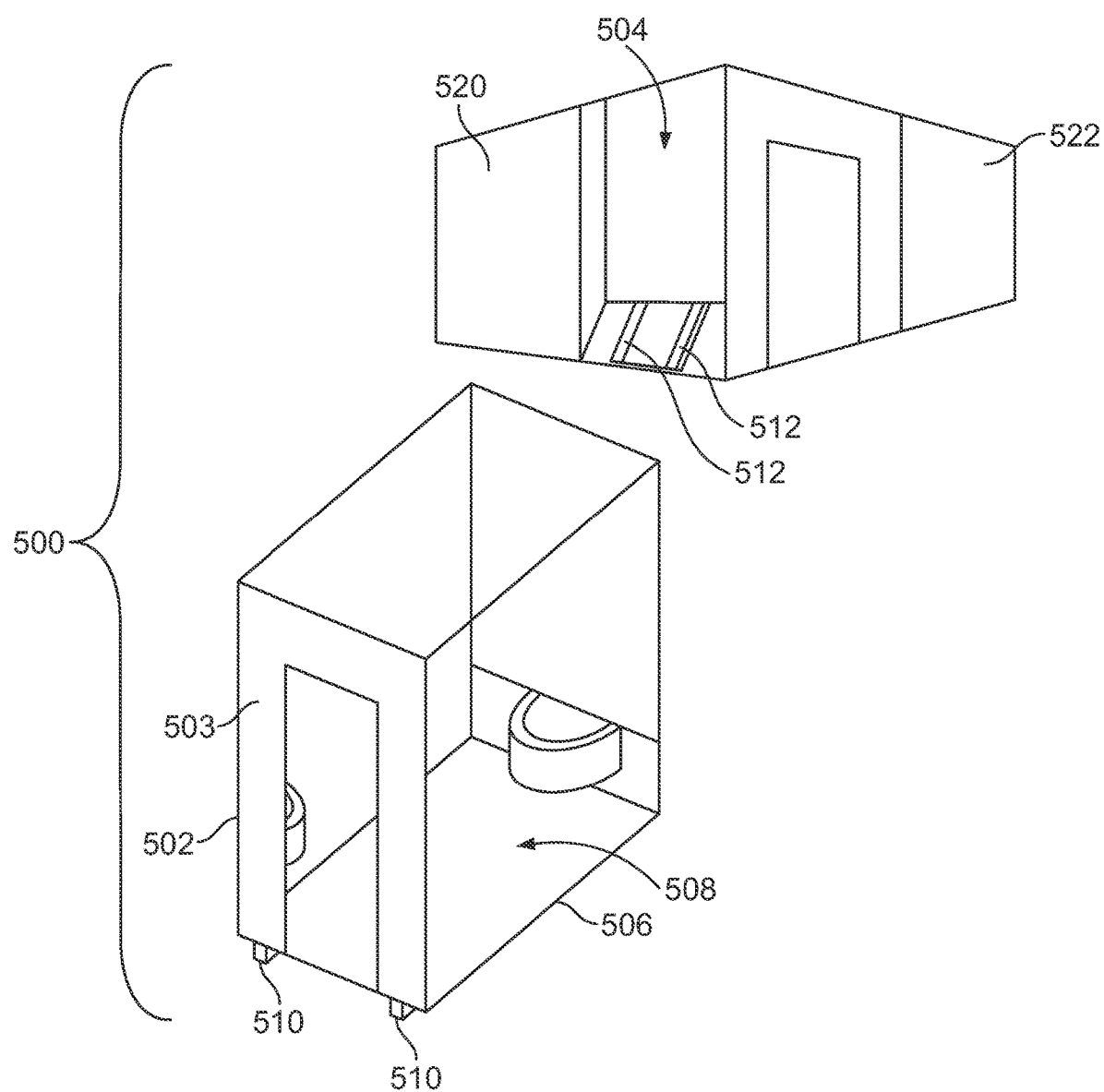
FIG. 5 illustrates a front perspective view of an aft rest area assembly, according to an embodiment of the present disclosure.

FIG. 5 illustrates a front perspective view of an aft rest area assembly 500, according to an embodiment of the present disclosure. The aft rest area assembly 500 includes one or more rest area modules that are configured to be interchangeably secured into particular positions. For example, the aft rest area assembly 500 may include a lavatory module 502 that is configured to be secured into a lavatory receptacle 504. The lavatory module 502 may include one or more walls 503 connected to a base 506, thereby defining an internal space 508. Guide beams 510 may extend downwardly from the base 506 and are configured to be slidably retained within guide tracks 512 of the lavatory receptacle 504. In this manner, the lavatory module 502 may be inserted into the lavatory receptacle 504. Optionally, the rest area assembly 500 may not include the guide beams that are configured to be retained within the guide tracks.

Various lavatory modules 502 may be formed having different components. As such, a manufacturer may insert a particular lavatory module into reciprocal lavatory receptacles based on desired features. The guide beams 510 may slide into the guide tracks 512 and securely engage securing structures, such as latches, snaps, catches, and the like, in order to secure the lavatory module 502 in place. Fasteners may also be used to securely fasten the lavatory module 502 in place.

Each section of the aft rest area assembly may include module components. For example, galley modules 520 and 522 may be selectively inserted and removed from reciprocal galley receptacles. Each module 520 and 522 may include the same or different components.

The modules allow interchangeability of various portions and components. Optionally, each module may include various interfaces that allow for selective insertion and removal of various components. For example, instead of separate and distinct modules, an aft rest area assembly may include various interfaces and/or couplings that allow for selective positioning and/or removal of various components, such as sinks, waste containers, toilets, urinals, and/or the like.

Any of the embodiments of the present disclosure may utilize interchangeable modules. Further, any of the embodiments of the present disclosure may utilize interchangeable components within internal spaces.

Figure 6:
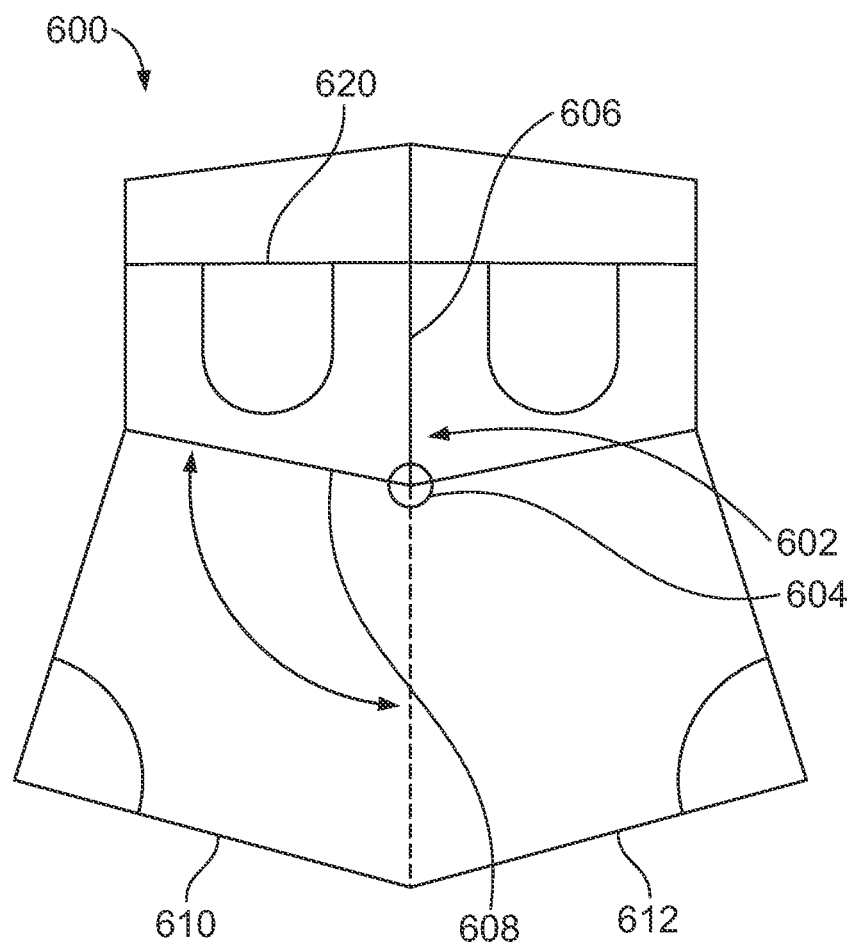
FIG. 6 illustrates a simplified top internal view of a lavatory section of an aft rest area assembly, according to an embodiment of the present disclosure.

FIG. 6 illustrates a simplified top internal view of a lavatory section 600 of an aft rest area assembly, according to an embodiment of the present disclosure. The lavatory section 600 is similar to those described above, except that a dividing wall 602 may include a pivot column 604 between a fixed wall segment 606 and a pivotable wall segment 608. The pivotable wall segment 608 may be pivoted into either lavatories 610 or 612 to convert the two lavatories into a single expanded lavatory that may be comfortably used by persons with reduced mobility. For example the pivotable wall segment 608 may be pivoted to be parallel to a rear wall 620, thereby providing an expanded space. Alternatively, various other moveable wall portions may be used. The moveable wall shown and described with respect to FIG. 6 may be used with any of the embodiments of the present application in order to convert adjacent lavatories into a single, expanded lavatory.

Figure 7:
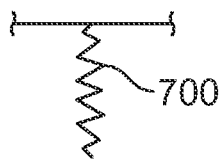
FIG. 7 illustrates a simplified top internal view of a dividing wall of a lavatory section of an aft rest area assembly, according to an embodiment of the present disclosure.

FIG. 7 illustrates a simplified top internal view of a dividing wall 700 of a lavatory section of an aft rest area assembly, according to an embodiment of the present disclosure. The dividing wall 700 may be moved between extended and compressed positions. The dividing wall 700 may be compressed similar to an accordion, as shown, to create a single expanded lavatory. Alternatively, the dividing wall 700 may be a bi-fold wall, for example. Notably, the embodiments shown and described with respect to FIG. 7 may be used with any of the embodiments of the present disclosure.

Additionally, when the dividing wall is capable of being moved between a first position in which the lavatories are separated, and a second position in which the two lavatories are converted into an expanded lavatory, a sign on or proximate to the door(s) of the lavatories may indicate such a capability. For example, a sign may instruct a passenger to request assistance from a flight attendant to convert the lavatory section into a single expanded lavatory.

Figure 8:
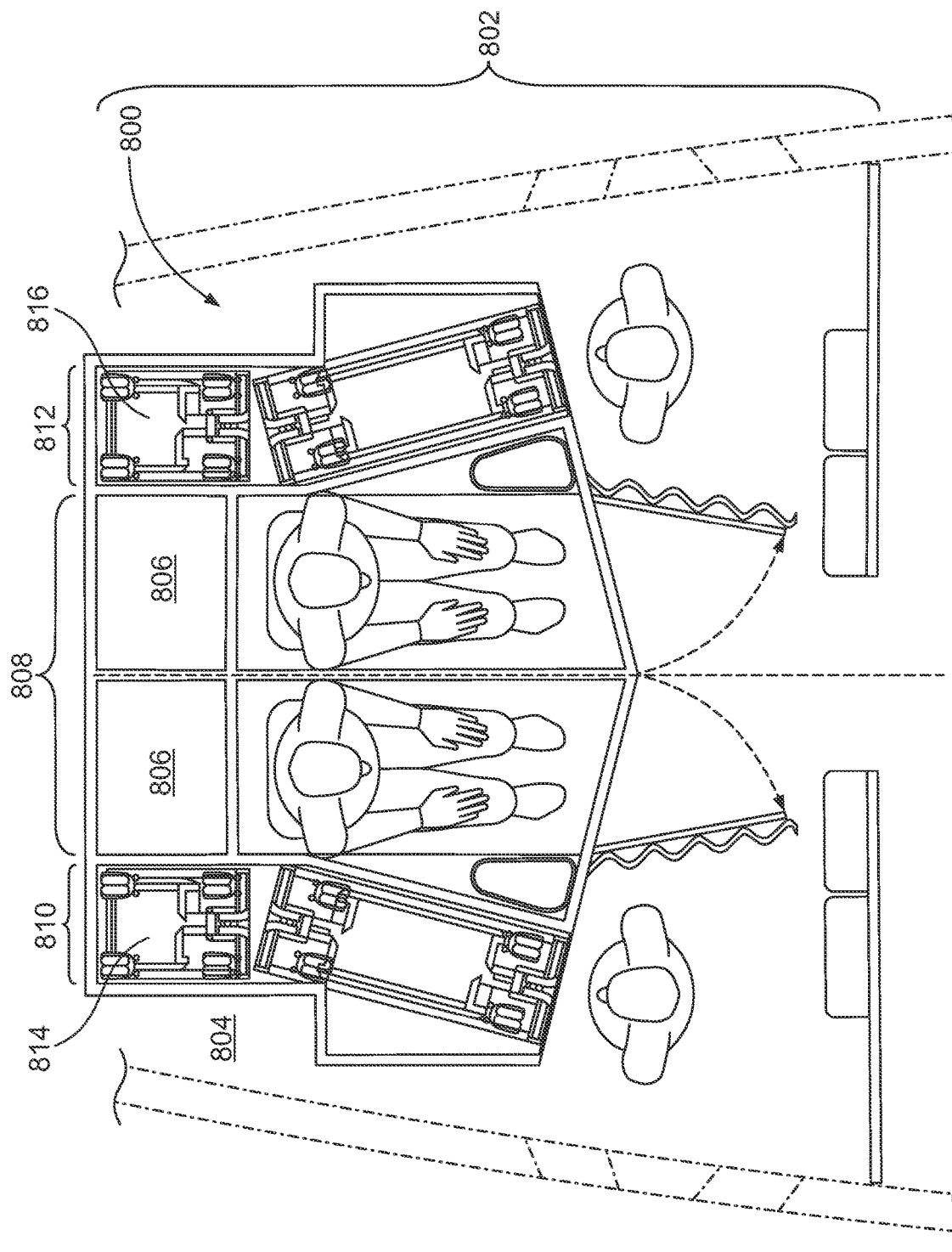
FIG. 8 illustrates a top internal view of an aft rest area assembly within an aft section of an internal cabin of an aircraft, according to an embodiment of the present disclosure.

FIG. 8 illustrates a top internal view of an aft rest area assembly 800 within an aft section 802 of an internal cabin 804 of an aircraft, according to an embodiment of the present disclosure. The aft rest area assembly 800 is similar to the aft rest area assembly 200 of FIG. 4, except that aft rest area assembly 800 is shown within the aft section of a flat pressure bulkhead. Accordingly, stowage areas 806 within the lavatory section 808 may be deeper and box-shaped. Also, each galley station 810 and 812 may rearwardly extend further and be able to accommodate additional carts 814 and 816.

Figure 9:
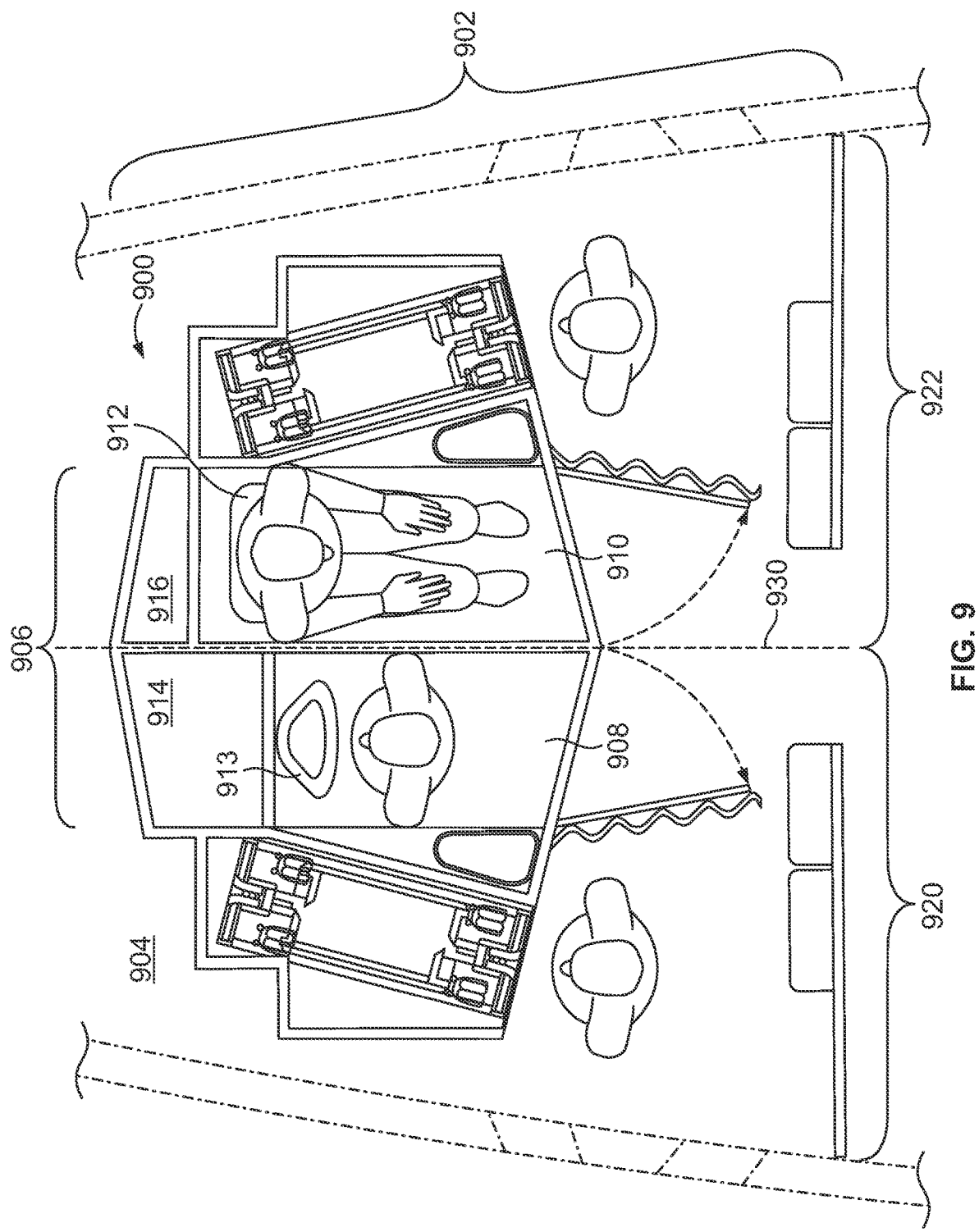
FIG. 9 illustrates a top internal view of an aft rest area assembly within an aft section of an internal cabin of an aircraft, according to an embodiment of the present disclosure.

FIG. 9 illustrates a top internal view of an aft rest area assembly 900 within an aft section 902 of an internal cabin 904 of an aircraft, according to an embodiment of the present disclosure. The aft rest area assembly 900 is similar to the aft rest area assembly 200 of FIG. 4, except that aft rest area assembly 900 includes a lavatory section 906 having a lavatory 908 that is configured differently than a lavatory 910. For example, the lavatory 908 includes a urinal 913, while the lavatory 910 includes a toilet 912. Further, a stowage area 914 within the lavatory 908 may be larger than a stowage area 916 within the lavatory 910 due to the urinal occupying less space than the toilet 912.

As shown, while the lavatories 908 and 910 are configured differently and include different components, the space occupied by the lavatory 908 (e.g., the footprint) is still a mirror image of the space occupied by the lavatory 910. As shown, an area of a first half 920 of the aft rest area assembly 900 is a mirror image of the area of the second half 922 of the aft rest area assembly 900. In short, the outer dimensions of the aft rest area assembly 900 are symmetrical with respect to a central longitudinal plane 930 of the cabin 904. The outer dimensions of the first half 920 mirror the outer dimensions of the second half 922.

When one of the lavatories 908 includes a urinal 913, but not a toilet, a sign on the door of the lavatory 908 may provide an appropriate indication. For example, the door of the lavatory 908 may indicate "men," or "urinal only."

Figure 10:
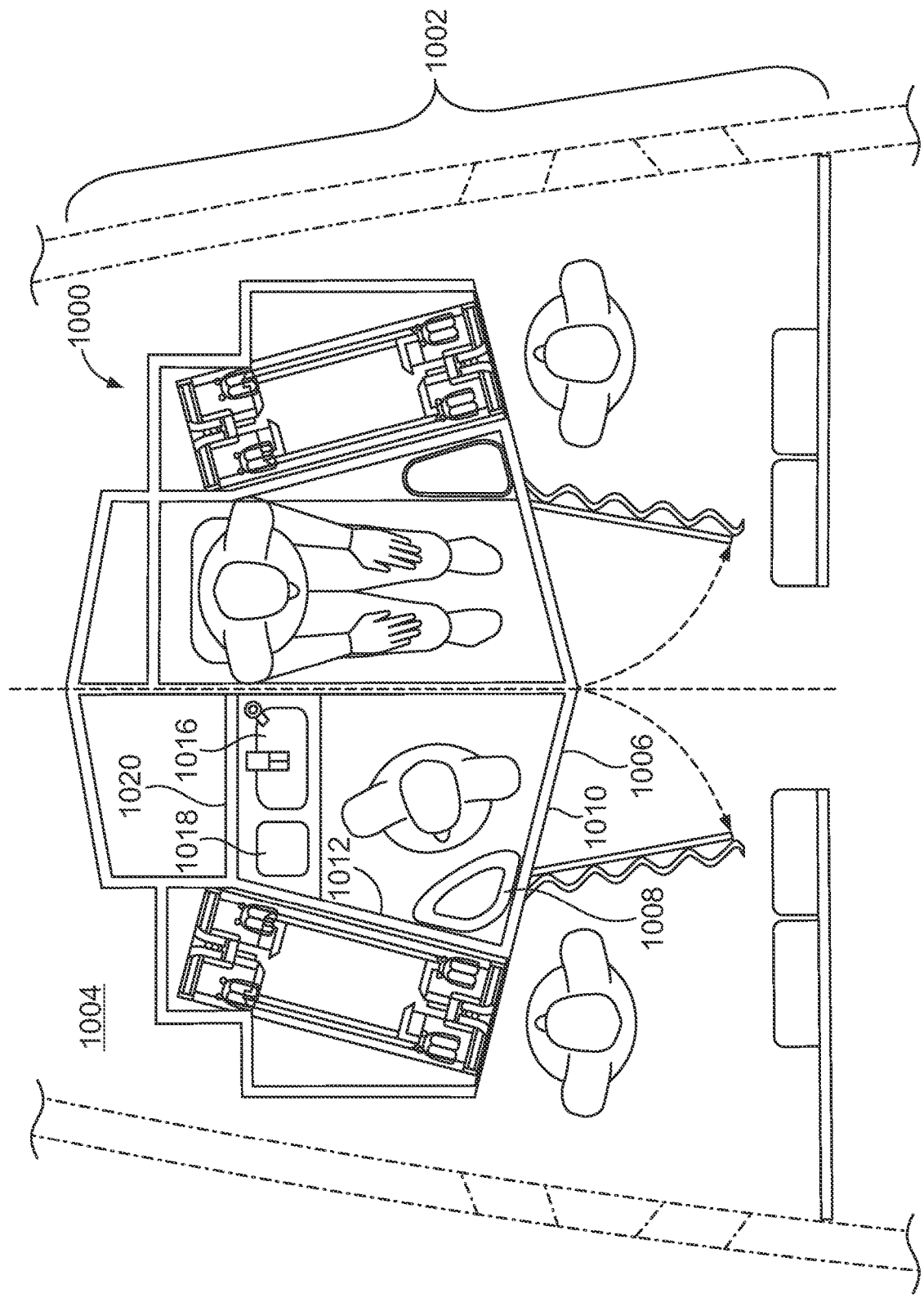
FIG. 10 illustrates a top internal view of an aft rest area assembly within an aft section of an internal cabin of an aircraft, according to an embodiment of the present disclosure.

FIG. 10 illustrates a top internal view of an aft rest area assembly 1000 within an aft section 1002 of an internal cabin 1004 of an aircraft, according to an embodiment of the present disclosure. The aft rest area assembly 1000 is similar to the aft rest area assembly 900 of FIG. 9, except that a lavatory 1006 may include a urinal 1008 proximate to a junction of a forward wall 1010 and a lateral boundary wall 1012, and a sink 1016 and a trash bin 1018 may be proximate to a rear wall 1020. Again, each lavatory may include different components at different areas. The components may be selectively connected and removed from interfaces, couplings, and/or fittings. Further, as noted above, each aft rest area assembly may be configured to selectively receive and retain interchangeable modules.

Figure 11:
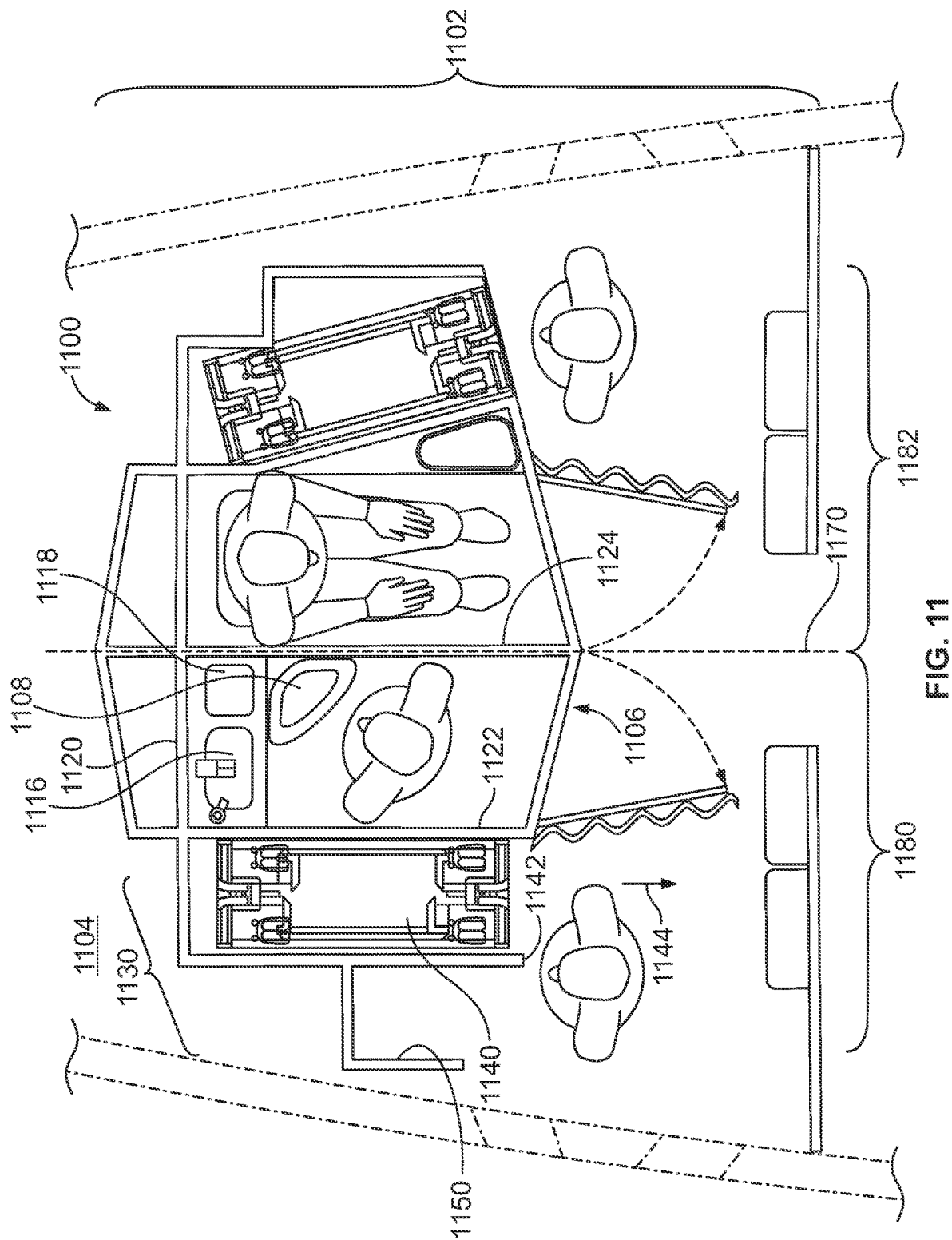
FIG. 11 illustrates a top internal view of an aft rest area assembly within an aft section of an internal cabin of an aircraft, according to an embodiment of the present disclosure.

FIG. 11 illustrates a top internal view of an aft rest area assembly 1100 within an aft section 1102 of an internal cabin 1104 of an aircraft, according to an embodiment of the present disclosure. The aft rest area assembly 1100 is similar to the aft rest area assembly 1000 of FIG. 10, except that a lavatory 1106 may include a fold-out/pull-out urinal module 1108 in front of a sink 1116 and a trash bin 1118 proximate to a rear wall 1120. The urinal module 1108 may be moved between extended and retracted positions by hand, foot, a touch free actuating device, and/or the like. Because a toilet is not within the lavatory 1106, less internal space is needed. As such, a boundary wall 1122 may be parallel with a dividing wall 1124. As such, a galley station 1130 may be oriented to be parallel to the dividing wall 1124. The galley station may include straight, linear outer walls that are parallel or perpendicular to the dividing wall 1124. A cart 1140 stored within a cart storage bin 1142 is configured to be removed in a direction 1144 that is parallel to the dividing wall 1124. Further, an additional storage bin 1150 may be adjacent to the cart storage bin 1142.

As shown, the aft rest area assembly 1100 is not symmetrical with respect to a central longitudinal plane 1170 of the cabin 1104. Instead, a footprint of one or more portions of a first half 1180 may not mirror a footprint of one or more portions of a second half 1182. Nevertheless, the dividing wall 1124 may be centered about the central longitudinal plane 1170. Indeed, each of the embodiments of the present disclosure may provide an aft rest area assembly that is centered about a central longitudinal plane of an interior cabin of an aircraft.

Each lavatory may include different components at different areas. The components may be selectively connected and removed from interfaces, couplings, and/or fittings. Further, as noted above, each aft rest area assembly may be configured to selectively receive and retain interchangeable modules.

As described above, embodiments of the present disclosure provide aft rest area assemblies that efficiently utilize space within the aft section of an aircraft. Embodiments of the present disclosure provide aft rest area assemblies that allow for more seating aboard an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An aft rest area assembly within an aft section of an internal cabin of an aircraft, the aft rest area assembly comprising:
   a lavatory section including: (a) at least one lavatory, wherein the lavatory section includes first and second lavatories separated by a dividing wall, wherein the dividing wall is coaxially aligned with an aisle of the internal cabin, and (b) an egress flow director that forwardly extends into an unused portion of one or more egress paths of the internal cabin, and wherein the one or more egress paths connect to at least one emergency exit door;
   wherein the lavatory section comprises one or more lavatory receptacles configured to receive and retain one or more lavatory modules, wherein the one or more lavatory modules are configured to be inserted and secured into the one or more lavatory receptacles.

2. The aft rest area assembly of claim 1, further comprising a front wall that separates the aft rest area assembly from a seating area within the internal cabin, wherein the egress flow director comprises first and second forward walls that connect at a central apex, wherein each of the first and second forward walls rearwardly recedes in relation to the front wall from the central apex.

3. The aft rest area assembly of claim 1, further comprising:
   a first galley station positioned on a first outboard side of the lavatory section; and
   a second galley station positioned on a second outboard side of the lavatory, wherein the first outboard side is opposite from the second outboard side, and wherein the first galley station is separated from the second galley station by the lavatory section.

4. The aft rest area assembly of claim 3, wherein the first galley station comprises a first cart storage bin configured to removably retain a first mobile cart, and wherein the second galley station comprises a second cart storage bin configured to removably retain a second mobile cart.

5. The aft rest area assembly of claim 3, further comprising first and second attendant rest areas, wherein the first attendant rest area is proximate to the first galley station, and wherein the second attendant rest area is proximate to the second galley station.

6. The aft rest area assembly of claim 5, wherein each attendant rest area comprises a moveable curtain and at least one attendant seat, wherein the at least one attendant seat does not interfere with any portion of the lavatory section.

7. The aft rest area assembly of claim 1, wherein the dividing wall includes at least one moveable portion, wherein the at least one moveable portion is moveable between a first position in which the first and second lavatories are separated by the dividing wall, and a second position in which the first and second lavatories are combined to form a single expanded lavatory.

8. The aft rest area assembly of claim 1, wherein each of the first and second lavatories comprises forward and rearward areas, wherein each of the forward areas is wider than the rearward areas.

9. The aft rest area assembly of claim 1, wherein the dividing wall is centered about a central longitudinal plane of the internal cabin.

10. The aft rest area assembly of claim 1, wherein the dividing wall divides the aft rest area assembly into first and second halves, wherein the first half is a mirror image of the second half.

11. The aft rest area assembly of claim 1, wherein the aft rest area assembly is symmetrical with respect to a central longitudinal plane of the internal cabin.

12. The aft rest area assembly of claim 1, wherein the aft section is behind a final row of seats within the internal cabin.

13. The aft rest area assembly of claim 1, wherein the lavatory section includes at least one stowage area.

14. An aft rest area assembly within an aft section of an internal cabin of an aircraft, the aft rest area assembly comprising:
a lavatory section including at least one lavatory having a lavatory receptacle that receives and retains a lavatory module, wherein the lavatory module is interchangeably securable within the lavatory receptacle;
a first galley station positioned on a first outboard side of the lavatory section; and
a second galley station positioned on a second outboard side of the lavatory section, wherein the first outboard side is opposite from the second outboard side, and wherein the first galley station is separated from the second galley station by the lavatory section.

15. The aft rest area assembly of claim 14, further comprising first and second attendant rest areas, wherein the first attendant rest area is proximate to the first galley station, and wherein the second attendant rest area is proximate to the second galley station.

16. An aircraft comprising:
an internal cabin including a cockpit, a main cabin having a plurality of passenger seats and at least one attendant workstation, and an aft section behind the main cabin, wherein the aft section includes one or more egress paths that connect to at least one emergency exit door; and
an aft rest area assembly within the aft section, the aft rest area assembly comprising:
a lavatory section including (a) first and second lavatories separated by a dividing wall that is centered about a central longitudinal plane of the internal cabin, wherein the dividing wall is coaxially aligned with an aisle of the internal cabin, and (b) at least one stowage area, wherein each of the first and second lavatories includes forward and rearward areas, wherein each of the forward areas is wider than the rearward areas, wherein the first and second lavatories provide an egress flow director that forwardly extends into an unused portion of the one or more egress paths;
wherein the lavatory section comprises one or more lavatory receptacles configured to receive and retain one or more lavatory modules,
wherein the one or more lavatory modules are configured to be inserted and secured into the one or more lavatory receptacles;
a first galley station positioned on a first outboard side of the lavatory section, wherein the first galley station includes a first cart storage bin configured to removably retain a first mobile cart;
a second galley station positioned on a second outboard side of the lavatory, wherein the second galley station includes a second cart storage bin configured to removably retain a second mobile cart, wherein the first outboard side is opposite from the second outboard side, and wherein the first galley station is separated from the second galley station by the lavatory section;
a first attendant rest area proximate to the first galley station;
a second attendant rest area proximate to the second galley station, wherein each of the first and second attendant rest areas includes a moveable curtain and at least one attendant seat, wherein the at least one attendant seat does not interfere with the lavatory section; and
a front wall that separates the aft rest area assembly from the main cabin.

17. The aircraft of claim 16, wherein the dividing wall includes at least one moveable portion, wherein the at least one moveable portion is moveable between a first position in which the first and second lavatories are separated by the dividing wall, and a second position in which the first and second lavatories are combined to form a single expanded lavatory.

* * * * *